(12) United States Patent
Watanabe et al.

(10) Patent No.: US 6,517,274 B1
(45) Date of Patent: Feb. 11, 2003

(54) SEALED JOINING OF TWO PARTS EACH HAVING JOINING SURFACES MEETING AT RIGHT ANGLES

(75) Inventors: Takaya Watanabe, Yokohama (JP);
Shinji Kawai, Yokohama (JP);
Shinichirou Hirayama, Yokohama (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 09/572,964

(22) Filed: May 18, 2000

(30) Foreign Application Priority Data

May 24, 1999 (JP) .......................................... 11-143619

(51) Int. Cl.$^7$ ................................................ F16J 15/14
(52) U.S. Cl. ......................... 403/13; 403/14; 403/288; 277/591
(58) Field of Search ................................ 403/13, 4, 14, 403/335, 296, 280; 123/90.6; 277/590, 591

(56) References Cited

U.S. PATENT DOCUMENTS

| | | | | |
|---|---|---|---|---|
| 2,251,733 A | * | 8/1941 | Frost ............................ | 403/13 |
| 4,416,562 A | * | 11/1983 | Jons ............................. | 403/13 |
| 6,193,430 B1 | * | 2/2001 | Culpepper et al. ............ | 403/13 |

FOREIGN PATENT DOCUMENTS

| | | | | |
|---|---|---|---|---|
| AU | 114594 A | * | 2/1972 | .................. 403/13 |
| JP | 10-47019 | | 2/1998 | |

* cited by examiner

Primary Examiner—Lynne H. Browne
Assistant Examiner—Ernesto Garcia
(74) Attorney, Agent, or Firm—Foley & Lardner

(57) ABSTRACT

Provided is a structure for joining a first part (e.g., a part constituted by a cylinder head and a front cover of an automotive internal combustion engine) having a pair of first and second internal joining surfaces meeting at right angles and a second part (e.g., a part constituted by a cam bracket of the engine) having a pair of first and second external joining surfaces meeting at right angles in such a manner that the first and second internal joining surfaces are respectively joined with the first and second external joining surfaces by interposing therebetween sealant for thereby providing a seal between the first internal joining surface and the first external joining surface and between the second internal joining surface and the second external joining surface. A pair of depressions are provided to the first external joining surface. A pair of projections are provided to the first internal joining surface for insertion into the depressions and thereby positioning the second part relative to the first part. A pair of slanted guide grooves are provided to inner circumferential surfaces of the depressions for guiding insertion of the projections into the depressions, respectively. Each of the guide grooves is disposed between each of the depressions and an edge at which the first and second external joining surfaces meet, and formed so as to expand each of the depressions increasingly toward an open end of each of the depressions.

19 Claims, 7 Drawing Sheets

SEALED JOINING OF TWO PARTS EACH HAVING JOINING SURFACES MEETING AT RIGHT ANGLES

BACKGROUND OF THE INVENTION

The present invention relates to a sealed joint structure for joining mechanical or structural parts by interposing therebetween sealant and more specifically to an improvement in sealed joining of two parts each having joining surfaces meeting at right angles and requiring to be sealed at the same time.

An automotive engine has a plurality of cam brackets (also called bearing caps) fixedly attached to an upper joining surface of a cylinder head so as to support therebetween a camshaft as is for example disclosed in Japanese Patent provisional Publication No. 10-47019.

In some automotive engine, a front cover is disposed at the front side of a cylinder head and a cam bracket and fixedly attached thereto.

FIGS. 8 to 10 show a structure for joining a cam bracket 3 to a cylinder head 2 and a front cover 4. With such a structure, sealant is applied to the upper joining surface S1 of the cylinder head 2, and then the cam bracket 3 and the cylinder head 2 are positioned relative to each other by means of a depression 9 of the cam bracket 3 and a projection 8 of the cylinder head 2 and joined together, as shown in FIG. 9, with the sealant being disposed therebetween (actually, two pairs of projections 8 and depressions 9 are provided though only one pair is shown).

Then, sealant is applied to a joining surface S2 of the front cover 4, and thereafter the front cover 4 is joined to the cylinder head 2 and the cam bracket 3, as shown in FIG. 10, by interposing therebetween the sealant.

Sealing of the cam bracket 3 with respect to the joining surfaces S1 and S2 is necessitated for preventing a lubricant for lubrication of a bearing portion of the cam bracket 3 from leaking or oozing out from the cam bracket 3.

SUMMARY OF THE INVENTION

A problem of the above described joining structure is that in case the cam bracket 3 is removed for removal of a camshaft after they are once assembled, reinstallation of the cam bracket 3 requires removal of the front cover 4 due to the necessity of carrying out the sealing process steps in the same order as that at the first assemblage.

This is for the following reason. In order to reinstall the cam bracket 3, without removal of the front cover 4 as shown in FIG. 11, after application of sealant to the joining surfaces S1 and S2 of the cylinder head 2 and the front cover 4, the cam bracket 3 must be moved downward while being held in contact with the joining surface S2 of the front cover 4, thus allowing the sealant on the joining surface S2 to be scraped off and therefore causing a defective seal.

Accordingly, for attaining a desired seal between the front cover 4 and the cam bracket 3 at the time of reinstallation of the cam bracket 3, removal of the front cover 4 is inevitable, thus making the working time necessary for the reinstallation longer.

It is accordingly an object of the present invention to provide a novel and improved structure for joining a pair of first and second parts together which can attain a good simultaneous seal between two pair of joining surfaces each meeting at right angles, notwithstanding a pair of positioning projections are provided to one of the joining surfaces for positioning the first and second parts relative to each other.

It is a further object of the present invention to provide a method of joining the above described pair of parts which can attain a good simultaneous sealing between two pairs of joining surfaces each meeting at right angles.

To accomplish the above object, the present invention provides a novel and improved structure for joining a first part having a pair of first and second internal joining surfaces meeting at right angles and a second part having a pair of first and second external joining surfaces meeting at right angles in such a manner that the first and second internal joining surfaces are respectively joined with the first and second external joining surfaces by interposing therebetween sealant for thereby providing a seal between a pair of the first internal joining surface and the first external joining surface and between a pair of the second internal joining surface and the second external joining surface, the structure comprising a pair of depressions provided to the first external joining surface, a pair of projections provided to the first internal joining surface at locations corresponding to the depressions for insertion into the depressions and thereby positioning the second part relative to the first part, and a pair of slanted guide grooves provided to inner circumferential surfaces of the depressions for guiding the insertion of the projections into the depressions, respectively, each of the guide grooves being disposed between each of the depressions and an edge at which the first and second external joining surfaces meet, and formed so as to expand each of the depressions increasingly toward an open end of each of the depressions.

It is a further object of the present invention to provide a novel and improved method of joining a first part having a pair of first and second internal joining surfaces meeting at right angles and a second part having a pair of first and second external joining surfaces meeting at right angles in such a manner that the first and second internal joining surfaces are respectively joined with the first and second external joining surfaces by interposing therebetween sealant for thereby providing a seal between a pair of the first internal joining surface and the first external joining surface and between a pair of the second internal joining surface and the second external joining surface, the second part having an edge at which the first and second external joining surface meet, wherein a pair of projections are provided to the first internal joining surface and a pair of depressions are provided to the first external joining surface at locations corresponding to the projections and fittingly engageable with the projections for positioning the second part relative to the first part, the method comprising providing each of the depressions with such a slanted guide groove that is located between each of the depressions and the edge of the second part and formed so as to expand each of the depressions toward an open ends of each of the depressions, and guiding insertion of the projections into the depression by the guide grooves such that the first and second external joining surfaces are respectively brought into contact with the first and second internal joining surfaces nearly simultaneously.

DESCRIPTION OF THE PREFERRED EMBODIMENTS

Figure 1:
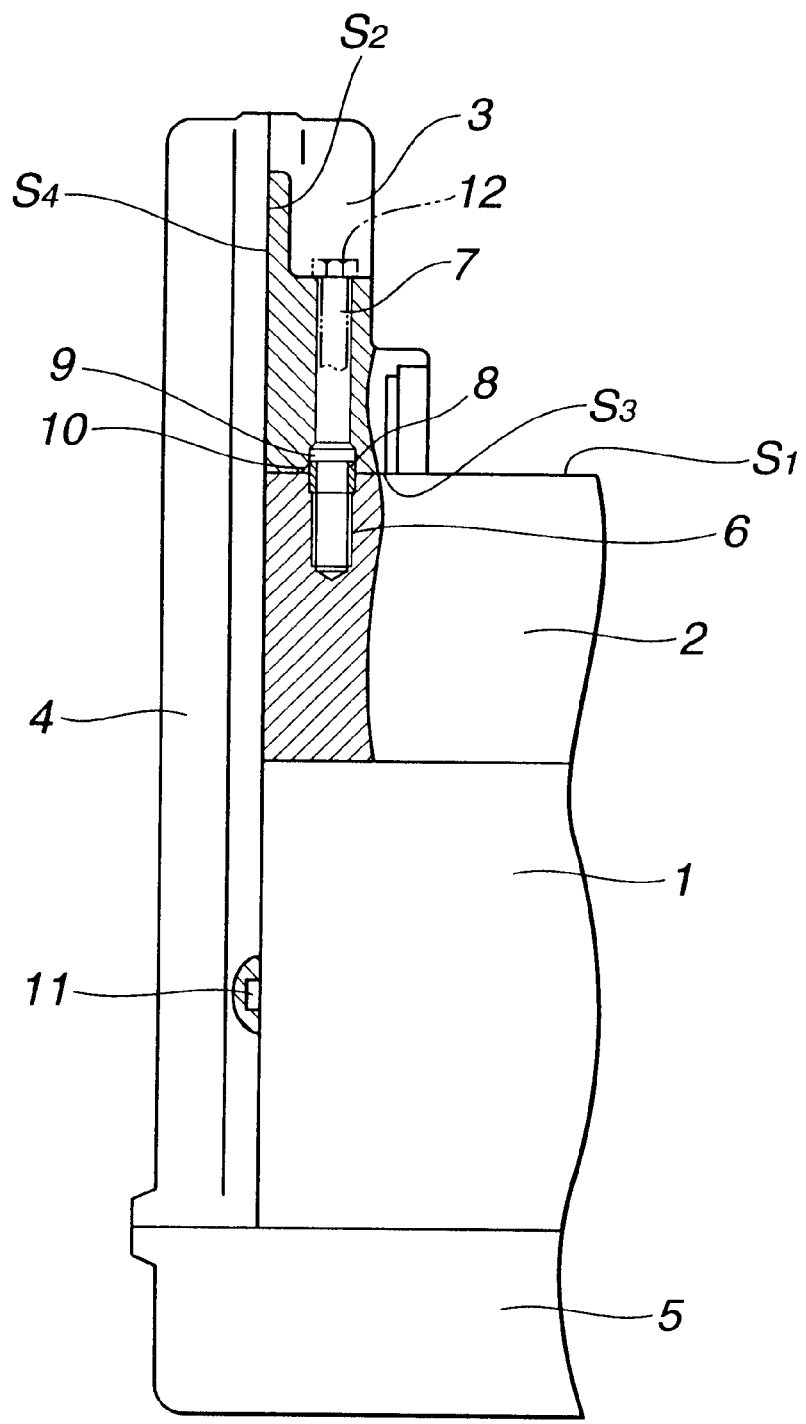
FIG. 1 is a schematic, partly-sectional, fragmentary side elevation of an internal combustion engine according to an embodiment of the present invention.
Figure 2A:
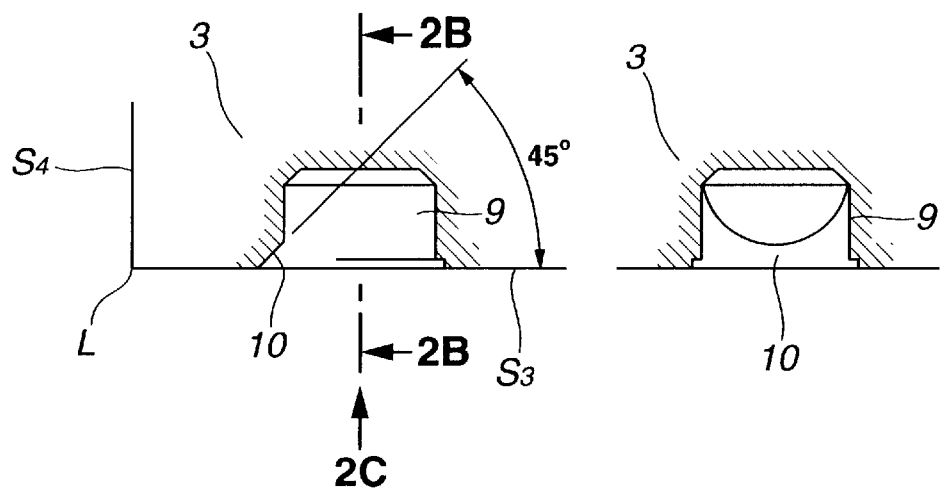
FIG. 2A is an enlarged view of a depression with a guide groove, which is formed in a cam bracket of the engine of FIG. 1.
Figure 2B:
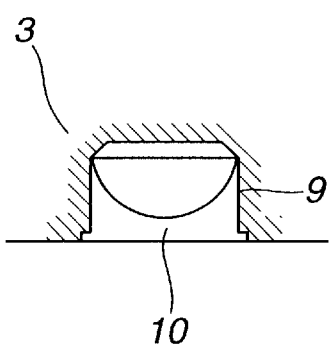
FIG. 2B is a sectional view taken along the line 2B—2B in FIG. 2A.
Figure 2C:
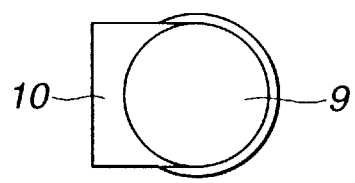
FIG. 2C is a view taken along the arrowhead 2C in FIG. 2A.
Figure 3:
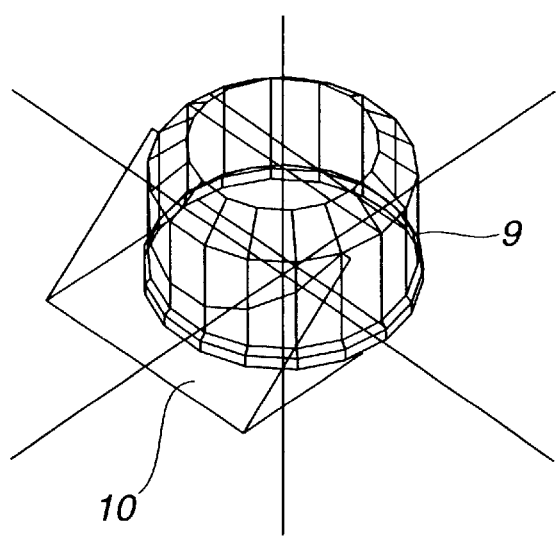
FIG. 3 is an enlarged, perspective view of the depression of FIGS. 2A to 2C.

Referring first to FIG. 1, an automotive internal combustion engine includes a cylinder block 1, a cylinder head 2 installed on the cylinder block 1, a cam bracket 3 installed on the cylinder head 2 to support a camshaft (not shown) therebetween, a front cover 4 attached to the front ends of the cylinder block 1, cylinder head 2 and cam bracket 3, and an oil pan 5 attached to the lower ends of the cylinder block 1 and the front cover 4.

The cylinder head 2 and the front cover 4 are adapted to constitute a first part having a pair of internal joining surfaces S1 and S2 meeting at right angles. Namely, the first part has an angled, female joining portion constituted by the internal joining surfaces S1 and S2. The cam bracket 3 constitutes a second part having a pair of external joining surfaces S3 and S4 meeting at right angles. Namely, the second part has an angled, male joining portion constituted by the pair of external joining surfaces S3 and S4.

In this instance, the joining surface S1 of the cylinder head 2 is formed with a pair of threaded holes 6 (though only one is shown) for attachment of the cam bracket 3 to the cylinder head 2. The cam bracket 3 is formed with a pair of through holes 7 (though only one is shown) for receiving bolts 12, at locations corresponding to the threaded holes 6.

Further, at the upper or outer end of each of the threaded holes 6, the cylinder head 2 is formed with a concentric hole 6a (refer to FIG. 5) larger in diameter than the threaded hole 6. An annular collar or guide ring 8 is fitted in each hole 6a in a way as to surround the threaded hole 6 and have an upper end portion projecting from the joining surface S1 of the cylinder head 2 to constitute a projection for positioning the cam bracket 3. The lower end portion of each through hole 7 is enlarged in diameter so as to form a depression 9 at a location corresponding to each guide ring 8.

At the time of installation of the cam bracket 3 on the cylinder head 2, a liquid gasket or sealant 13 (refer to FIG. 5) is first applied to the joining surface S1 of the cylinder head 2 uniformly. Then, the depressions 9 are fitted on the projections (guide rings) 8 to position the cam bracket 3 and the cylinder head 2 relative to each other, whereby the lower joining surface S3 of the cam bracket 3 is joined to the joining surface S1 of the cylinder head 2 by interposing therebetween the sealant 13. Thereafter, the bolts 12 are screwed into the threaded holes 6 through the holes 7 and tightened.

Installation of the front cover 4 is made by first applying a liquid gasket or sealant 13 (refer to FIG. 5) to the joining surface S4 uniformly and then joining the surface S4 to the joining surface S2 of the cam bracket 3.

In case the cam bracket 3 has been removed for removal of, for example, the cam shaft (not shown) after it had been once installed on the engine, it must be joined to the cylinder head 2 and the front cover 4 by interposing therebetween sealant at the time of its reinstallation.

Namely, the first part (i.e., assembly of cylinder head 2 and front cover 4) having two internal joining surfaces S1 and S2 meeting at right angles and the second part (i.e., cam bracket 3) having two external joining surfaces S3 and S4 meeting at right angles, must be joined by joining the pair of joining surfaces S3 and S4 to the pair of joining surfaces S1 and S2 by interposing therebetween sealant, respectively.

To this end, the following structure is devised.

As shown in FIGS. 2A–2C and 3, a slanted guide groove 10 is provided to an inner circumferential surface of each depression 9 of the cam bracket 3. The slanted guide groove 10 is located between each depression 9 and an edge L at which the joining surfaces S3 and S4 meet so as to expand each depression 9 radially and increasingly toward an open end of each depression 9. In other words, the slanted guide groove 10 is located on the edge L side of each groove 9 and has a slanted, planar bottom having an inner end meeting the inner circumferential surface of each depression 9 and an outer end meeting the joining surface S3.

Figure 4A:
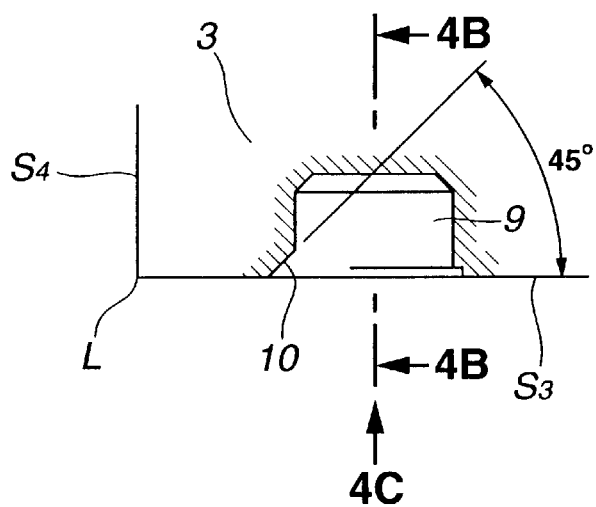
FIG. 4A is a view similar to FIG. 2A but shows another embodiment.
Figure 4B:
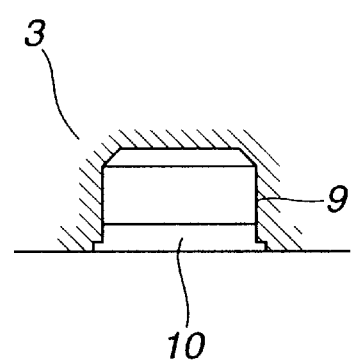
FIG. 4B is a sectional view taken along the line 4B—4B in FIG. 4A.
Figure 4C:
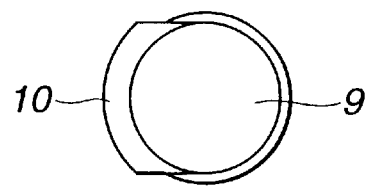
FIG. 4C is a view taken along the arrowhead 4C in FIG. 4A.

The angle of inclination of the guide groove 10 is about 45 degrees. Further, the inclined bottom is a planar surface but can be a portion of a conical surface as shown in FIG. 4.

Figure 7:
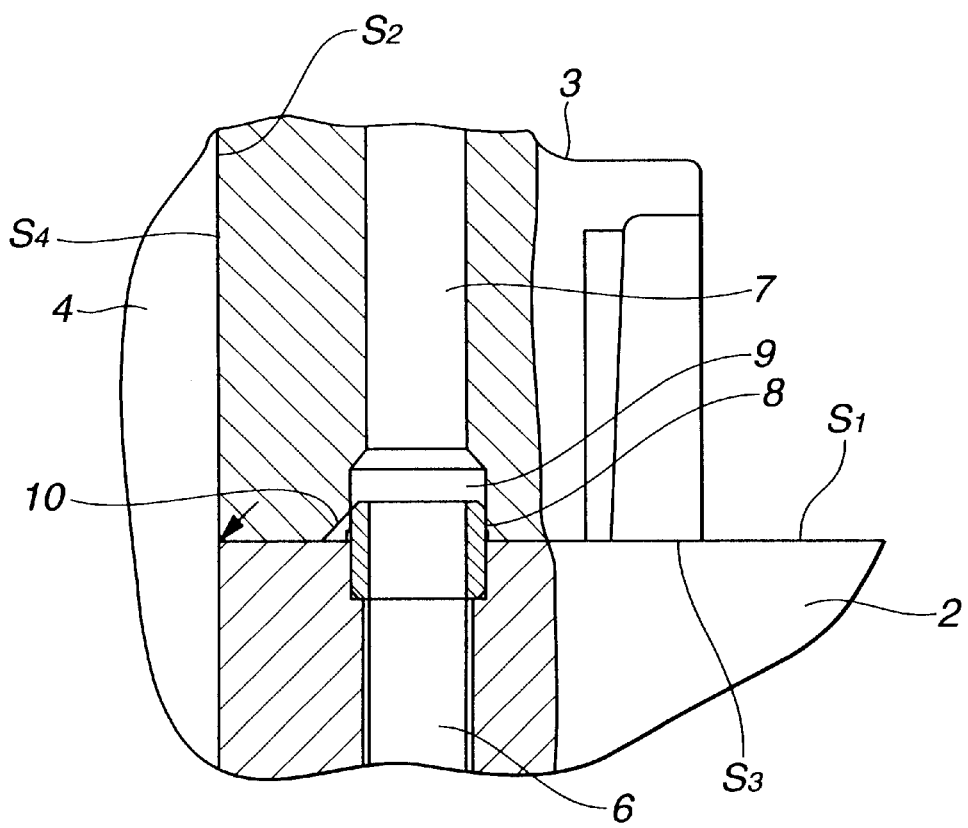
Figure 8:
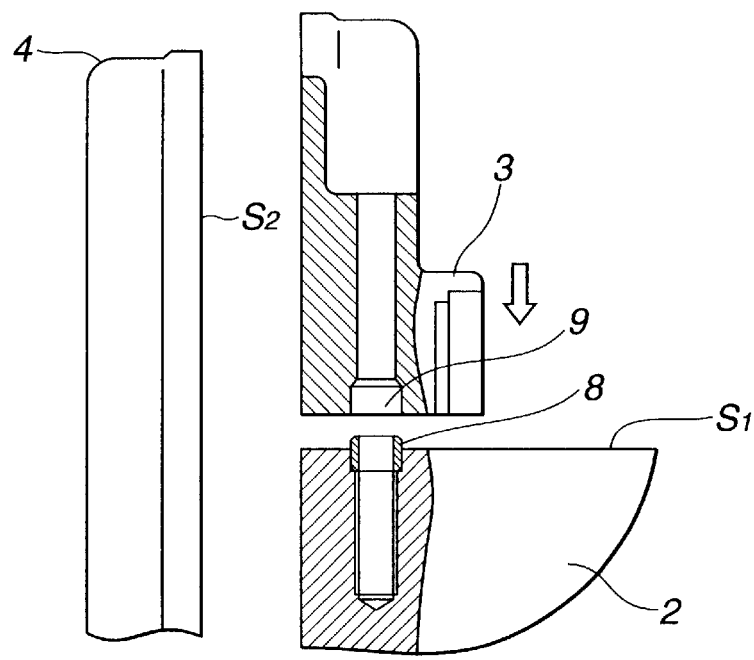
FIGS. 8 to 10 are illustrations of process steps for reinstallation of a cam bracket, which has a problem to be solved by the present invention.
Figure 9:
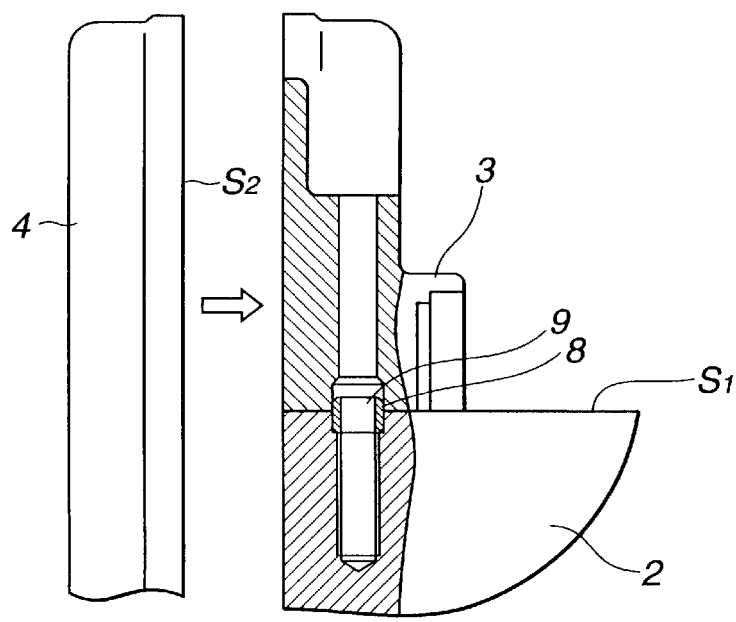
Figure 10:
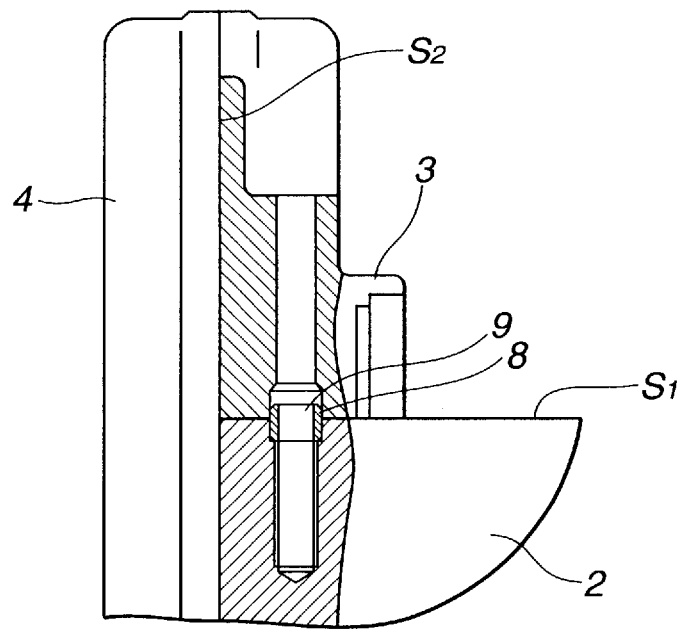
Figure 11:
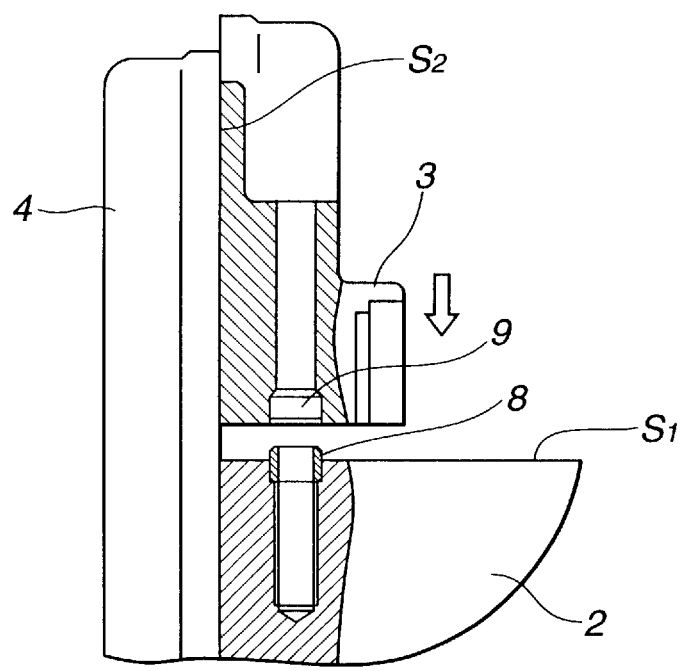
FIG. 11 is an illustration of another process step for reinstallation of a cam bracket, which has a problem to be solved by the present invention.

As shown in FIG. 7, the slanted guide groove 10 is constructed and arranged such that each of the guide grooves 10 and an inner circumferential surface of each of the depressions 9 are joined to form a ridge which is brought into contact with an upper end of each of the projections 8 when the external joining surface S3 of the cam bracket 3 is brought into contact with the joining surface S3 of the cylinder head 2. This is quite effective for bringing the joining surfaces S3 and S4 into contact with the respective joining surfaces S1 and S2 nearly simultaneously.

Figure 5:
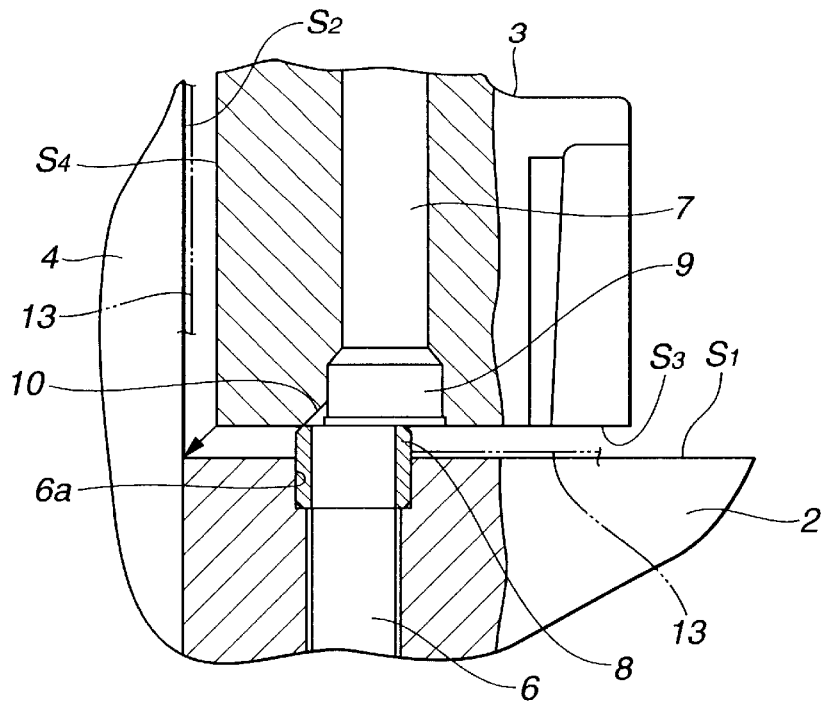
FIGS. 5 to 7 are illustrations of process steps for reinstallation of a cam bracket.
Figure 6:
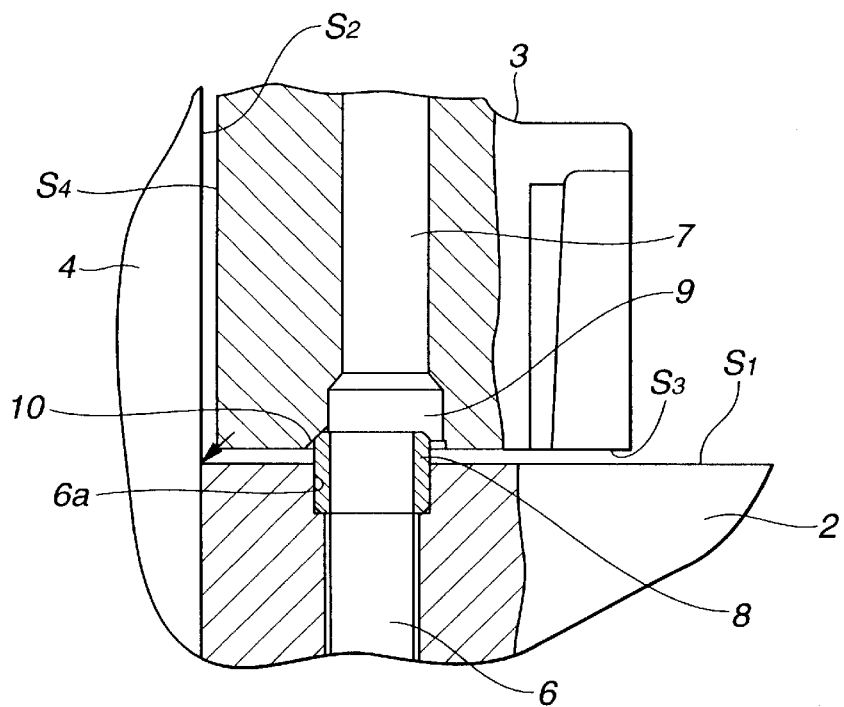

FIGS. 5 to 7 show process steps for reinstallation of the cam bracket 3 having the depressions 9 provided with the guide grooves 10.

In the first place, a liquid gasket or sealant 13 (refer to FIG. 5) is applied to the joining surface S1 of the cylinder head 2 and the joining surface S2 of the front cover 4 uniformly.

Then, the cam bracket 3 is set or held in such a position as shown in FIG. 5 to bring the upper or outer end of the guide groove 10 of each of the depressions 9 into contact with the upper end of each of the projection (guide ring) 8.

From this condition onward, the cam bracket 3 is moved obliquely in the direction of the cylinder head 2 to form 45 degrees with the joining surface S1 under the condition where each projection 8 is guided by each guide groove 10 so that each pair of mating surfaces (i.e., S1 and S3, S2 and S4) are finally brought into contact with each other as shown in FIG. 7.

By so doing, the cam bracket 3 is brought into contact with the joining surface S1 of the cylinder head 2 and the joining surface S2 of the front cover 4 nearly simultaneously, thus not causing any sealant 13 applied on the joining surfaces S1 and S2 to be scraped off but making it possible to attain a good seal between the cam bracket 3 and the cylinder head 2 and between the cam bracket 3 and the front cover 4.

In the foregoing, it is to be understood that the projection 8 and the depression 9 constitute a positioning means for positioning a male joining portion and a female joining portion relative to each other and that a slanted guide groove 10 constitutes a guide means for guiding insertion of the projection 8 into the depression 9.

From the foregoing, it will be understood that according to the present invention, the above described first and second parts can be joined together through oblique movement of one of the first and second parts relative to the other, which is enabled by guiding insertion of the projections by the guide grooves, whereby rubbing of the joining surfaces can be eliminated and therefore scraping of the sealant on the joining surfaces can be prevented. Accordingly, it becomes possible to attain an improved reliability of seal at the joining portions and an improved efficiency of work for joining parts to which sealant has been applied prior to their joining.

The entire content of Japanese Patent Application P11-143619 is incorporated herein by reference.

Although the invention has been described above by reference to certain embodiments of the invention, the invention is not limited to the embodiments described above. Modifications and variations of the embodiments described above will occur to those skilled in the art, in light of the above teachings. For example, the present invention can be applied to such a structure, for example, as shown in FIG. 1, wherein the cylinder block 1 and the oil pan 5 constitute the above described first part, the front cover 4 constitutes the above described second part, a projection (no numeral) is provided to the cylinder block 1 and a depression (no numeral) is provided to the front cover 4 to cooperate with the projection to constitute a positioning means 11. The scope of the invention is defined with reference to the following claims.

What is claimed is:

1. A method of joining a first part having a pair of first and second internal joining surfaces meeting at right angles and a second part having a pair of first and second external joining surfaces meeting at right angles in such a manner that the first and second internal joining surfaces are respectively joined with the first and second external joining surfaces by interposing therebetween sealant for thereby providing a seal between a pair of the first internal joining surface and the first external joining surface and between a pair of the second internal joining surface and the second external joining surface, the second part having an edge at which the first and second external joining surface meet, wherein a pair of projections are provided to the first internal joining surface and a pair of depressions are provided to the first external joining surface at locations corresponding to the projections and fittingly engageable with the projections for positioning the second part relative to the first part, the method comprising:

providing each of said depressions with such a slanted guide groove that is located between each of said depressions and said edge of said second part and formed so as to expand each of said depressions toward an open ends of each of said depressions; and guiding insertion of said projections into said depression by said guide grooves such that said first and second external joining surfaces are respectively brought into contact with said first and second internal joining surfaces nearly simultaneously.

2. The method according to claim 1, wherein said guiding comprises holding said second part at a position where each of said projections is in contact with a slanted surface of each of said guide grooves and moving said second part obliquely toward said first internal joining surface of said first part while holding each of said projections in contact with said slanted surface of each of said guide grooves.

3. A structure for joining parts, the structure comprising:

a first part having a first internal joining surface and a second internal joining surface meeting at a right angle;

a second part having a first external joining surface and a second external joining surface meeting at a right angle which are respectively brought into contact with the first internal joining surface and the second internal joining surface;

an edge at which the first external joining surface and the second external joining surface meet;

a sealant interposed between the second internal joining surface and the second external joining surface;

a depression provided in the first external joining surface, the depression having an inner surface which is vertical with respect to the first external joining surface;

a projection projecting from the first internal joining surface, the projection having an outer surface which is vertical with respect to the first internal joining surface and being placed at a location corresponding to the depression which positions the second part relative to the first part by an insertion of the projection into the depression; and a slanted guide groove having a slanted surface provided to the inner surface to guide the insertion of the projection into the depression, the slanted surface being disposed between the depression and the edge, and formed to expand the depression increasingly toward an open end of the depression.

4. The structure according to claim 3, wherein an angle of the slanted surface with respect to the first external joining surface is about 45 degrees.

5. The structure according to claim 3, wherein the slanted surface comprises a planar surface.

6. The structure according to claim 3, wherein the slanted surface comprises a part-conical surface.

7. The structure according to claim 3, wherein the projection is hollow and cylindrical, and the depression has a circular cross section.

8. The structure according to claim 7, wherein the slanted surface and the inner surface are joined to form a ridge which is brought into contact with an upper end of the projection when the first external joining surface and the second external joining surface are respectively brought into contact with the first internal joining surface and the second internal joining surface.

9. The structure according to claim 3, wherein the first internal joining surface and the second internal joining surface constitute a female joint section and the first external joining surface and the second external joining surface constitute a male joint section corresponding to the female joint section.

10. The structure according to claim 3, wherein the first part and the second part are configured for an internal combustion engine, the first part comprises a cylinder head and a front cover of the internal combustion engine, the second part comprises a cam bracket of the internal combustion engine, the first internal joining surface is a surface of the cylinder head, the second internal joining surface is a surface of the front cover, the first external joining surface is a first surface of the cam bracket, the second external joining surface is a second surface of the cam bracket different from the first surface of the cam bracket.

11. A structure for joining parts, the structure comprising:
- a first part having a first internal planar joining surface and a second internal planar joining surface meeting at a right angle;
- a second part having a first external planar joining surface and a second external planar joining surface meeting at a right angle which are respectively brought into contact with the first internal planar joining surface and the second internal planar joining surface;
- an edge at which the first external planar joining surface and the second external planar joining surface meet;
- a sealant interposed between the second internal planar joining surface and the second external planar joining surface;
- a depression provided in the first external planar joining surface, the depression having an inner surface which is vertical, with respect to the first external planar joining surface;
- a projection projecting from the first internal planar joining surface, the projection having an outer surface which is vertical with respect to the first internal planar joining surface and being placed at a location corresponding to the depression which positions the second part relative to the first part by an insertion of the projection into the depression; and
- a slanted guide groove having a slanted surface provided to the inner surface to guide the insertion, the slanted surface being disposed between the depression and the edge, and formed to expand the depression increasingly toward an open end of the depression.

12. The structure according to claim 11, wherein an angle of the slanted surface with respect to the first external planar joining surface is about 45 degrees.

13. The structure according to claim 11, wherein the slanted surface comprises a planar surface.

14. The structure according to claim 11, wherein the slanted surface comprises a part-conical surface.

15. The structure according to claim 11, wherein the projection is hollow and cylindrical, and the depression has a circular cross section.

16. The structure according to claim 15, wherein the slanted surface and the inner surface are joined to form a ridge which is brought into contact with an upper end of the projection when the first external planar joining surface and the second external planar joining surface are respectively brought into contact with the first internal planar joining surface and the second internal planar joining surface.

17. The structure according to claim 11, wherein the first internal planar joining surface and the second internal planar joining surface constitute a female joint section and the first external planar joining surface and the second external planar joining surface constitute a male joint section corresponding to the female joint section.

18. The structure according to claim 11, wherein the first part and the second part are configured for an internal combustion engine, the first part comprises a cylinder head and a front cover of the internal combustion engine, the second part comprises a cam bracket of the internal combustion engine, the first internal planar joining surface is a surface of the cylinder head, the second internal planar joining surface is a surface of the front cover, the first external planar joining surface is a first surface of the cam bracket, the second external planar joining surface is a second surface of the cam bracket different from the first surface of the cam bracket.

19. A structure for joining parts, the structure comprising:
- a first part having a female joint portion including a first internal joining surface and a second internal joining surface meeting at a right angle;
- a second part having a male joint portion including a first external joining surface and a second external joining surface meeting at a right angle and being respectively brought into contact with the first internal joining surface and the second internal joining surface;
- a sealant interposed between the second internal joining surface and the second external joining surface;
- positioning means for positioning the female joint portion and the male joint portion relative to each other, the positioning means including a projection projecting from the first internal joining surface and a depression provided in the first external joining surface, the projection having an outer surface which is vertical with respect to the first internal joining surface, the depression having an inner surface which is vertical with respect to the first external joining surface, the projection being for insertion into the depression; and
- guide means for guiding the insertion of the projection into the depression so as to allow the first internal joining surface and the second internal joining surface of the female joint portion to contact respectively the first external joining surface and the second external joining surface of the male joint portion nearly simultaneously.

* * * * *